United States Patent
Koishi

(10) Patent No.: US 7,417,931 B2
(45) Date of Patent: Aug. 26, 2008

(54) INFORMATION RECORDING METHOD, INFORMATION RECORDING APPARATUS AND INFORMATION RECORDING MEDIUM

(75) Inventor: Kenji Koishi, Sanda (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 304 days.

(21) Appl. No.: 10/543,317

(22) PCT Filed: Apr. 8, 2004

(86) PCT No.: PCT/JP2004/005097

§ 371 (c)(1),
(2), (4) Date: Jun. 14, 2006

(87) PCT Pub. No.: WO2004/093069

PCT Pub. Date: Oct. 28, 2004

(65) Prior Publication Data

US 2007/0140085 A1    Jun. 21, 2007

(30) Foreign Application Priority Data

Apr. 14, 2003  (JP) .............................. 2003-108827

(51) Int. Cl.
*G11B 7/00* (2006.01)

(52) U.S. Cl. .................. 369/59.11; 369/59.1; 369/47.5; 369/116

(58) Field of Classification Search .................. None
See application file for complete search history.

(56) References Cited

U.S. PATENT DOCUMENTS

| | | | |
|---|---|---|---|
| 5,848,043 A | 12/1998 | Takada et al. | |
| 6,222,815 B1 * | 4/2001 | Nagano | 369/47.51 |
| 6,280,810 B1 | 8/2001 | Nakamura et al. | |
| 2001/0017833 A1 | 8/2001 | Yamada et al. | |
| 2005/0265197 A1 * | 12/2005 | Kando et al. | 369/59.11 |

FOREIGN PATENT DOCUMENTS

EP    1 207 524 A2    5/2002

(Continued)

OTHER PUBLICATIONS

Taiwanese Office Action for corresponding Application No. 093110315 dated Mar. 7, 2008.
Japanese Office Action for corresponding Application No. 2006-507714, mailed Apr. 17, 2006.

(Continued)

*Primary Examiner*—Muhammad N. Edun
(74) *Attorney, Agent, or Firm*—Renner, Otto, Boisselle & Sklar, LLP

(57) ABSTRACT

An information recording method is provided, which comprises the steps of (a) determining a power level of a pulse sequence, (b) generating the pulse sequence based on the power level determined, and (c) irradiating an information recording medium with light corresponding to the pulse sequence generated to record information represented by at least either a recording mark or a space onto the information recording medium. The pulse sequence comprises a multi-pulse chain for forming the recording mark. The multi-pulse chain comprises a plurality of pulses having a peak power level. In the step (a), a bottom power level is determined between the peak power level and an erase power level which is lower than the peak power level while keeping an interpulse spacing constant.

24 Claims, 11 Drawing Sheets

FOREIGN PATENT DOCUMENTS

| | | |
|---|---:|---|
| JP | 2004-227617 | 8/2004 |
| TW | 1242200 | 10/2005 |
| WO | 00/60584 | 10/2000 |

OTHER PUBLICATIONS

International Search Report for corresponding Application No. PCT/JP2004/005097, mailed Aug. 30, 2004.

* cited by examiner

FIG.11
(a) 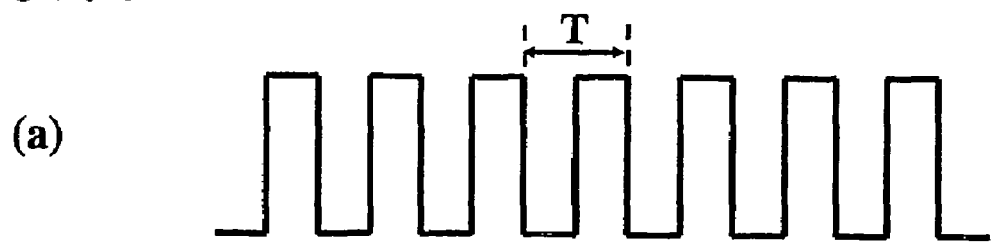
(b) 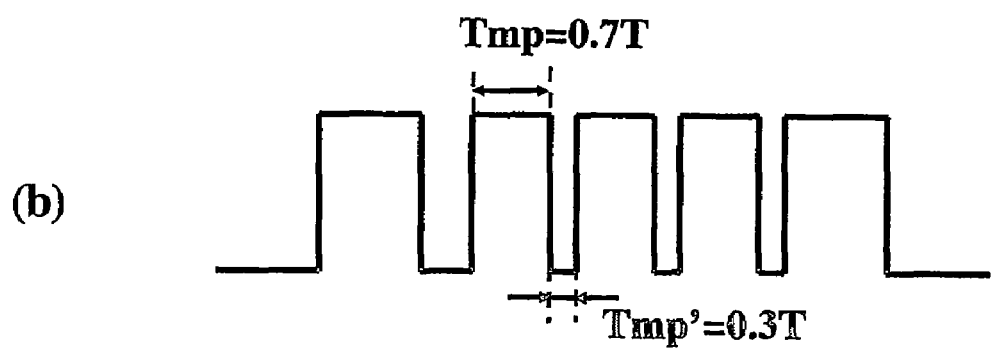
(c) 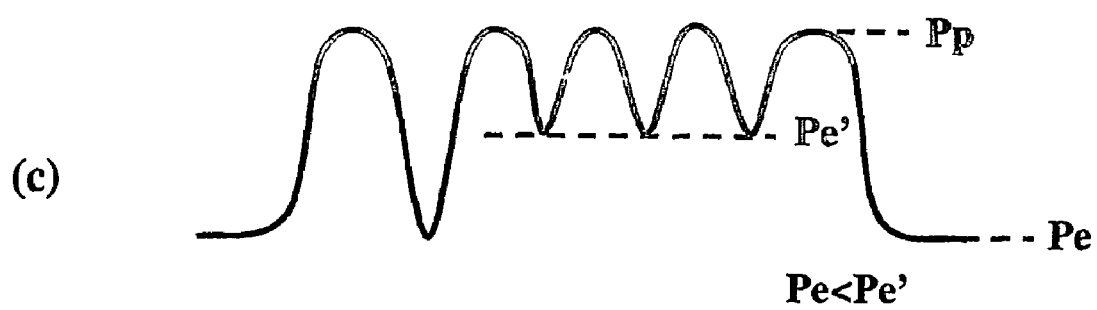

INFORMATION RECORDING METHOD, INFORMATION RECORDING APPARATUS AND INFORMATION RECORDING MEDIUM

TECHNICAL FIELD

The present invention relates to a method and apparatus for recording information onto a recording medium by irradiating the recording medium with a series of light pulses to form recording marks and spaces which represent the information. The present invention also relates to an information recording medium on which predetermined information is recorded.

The present invention can be applied to, for example, an optical head. The optical head can be used to irradiate information recording medium with light pulses having multi-pulse modulated waveforms to be recorded, thereby recording marks onto the information recording medium with a high transfer rate and a high density.

BACKGROUND ART

Japanese Laid-Open Publication No. 2001-222819 discloses a technique for irradiating an information recording medium with light pulses having multi-pulse modulated waveforms to be recorded, thereby recording marks onto the information recording medium with a high transfer rate and a high density (see paragraphs [0012] and [0013], FIG. 2). In this technique, the duty ratio of a recording pulse sequence is increased with an increase in the transfer rate of data so as to form recording marks having an appropriate shape and width.

However, the high transfer rate waveform modulation is limited by the modulation driving rate of a laser diode used for recording. Therefore, even if the duty ratio of a recording pulse sequence is increased with an increase in the recording transfer rate, it is not possible to form recording marks having an appropriate shape or width.

FIG. 10 is a diagram for explaining the formation of an inappropriate recording mark.

FIG. 10(a) shows a channel clock having a cycle T.

FIG. 10(b) shows a recording pulse sequence including a multi-pulse chain having a duty ratio of 50%. A plurality of pulses included in the multi-pulse chain each have a pulse width (Tmp) of 0.5T.

FIG. 10(c) shows a recording light emission waveform which is modulated and driven between a recording peak power level Pp and an erase power level Pe. If the sum of the rising time and falling time of the recording light emission waveform is sufficiently smaller than the pulse width (Tmp=0.5T), the bottom power level Pe' of the multi-pulse chain can be designed to be substantially equal to the erase power level Pe (Pe=Pe').

However, when information is recorded at a high transfer rate, the multi-pulse chain, which is used to form a substantially middle portion of the recording mark, lacks heat energy even if the duty ratio of the multi-pulse chain is 50%. This is because the influence of properties of the recording medium (e.g., the heat conduction of the recording medium, the heat storage of the recording medium, etc.) is increased with an increase in the transfer rate.

FIG. 10(d) shows the shape of a recording mark whose middle portion has a narrower mark width than that of the opposite ends. This recording mark is formed by irradiating a recording medium with a recording pulse sequence shown in FIG. 10(b).

FIG. 10(e) shows the amplitude of a reproduced signal which is obtained by reproducing information from the recording mark shown in FIG. 10(d). A reproduced signal corresponding to the middle portion of the recording mark has a reduced level of amplitude.

FIG. 11 is a diagram for explaining the formation of a recording mark using a technique disclosed in Japanese Laid-Open Publication No. 2001-222819.

FIG. 11(a) shows a channel clock having a cycle T.

FIG. 11(b) shows a recording pulse sequence including a multi-pulse chain having a duty ratio of 70%. A plurality of pulses included in the multi-pulse chain each have a pulse width (Tmp) of 0.7T. An interpulse spacing (Tmp') included in the multi-pulse chain is 0.3T.

In the technique of FIG. 10, when information is recorded at a high transfer rate, the multi-pulse chain, which is used to form a substantially middle portion of the recording mark, lacks heat energy even if the duty ratio of the multi-pulse chain is 50%. To solve such a problem, in the technique of FIG. 11, the pulse width Tmp of each pulse included in the multi-pulse chain is broadened, while the interpulse spacing Tmp' is shortened.

FIG. 11(c) shows a recording light emission waveform which is modulated and driven between a recording peak power level Pp and an erase power level Pe.

When information is recorded at a high transfer rate, the sum of the rising time and falling time of the recording light emission waveform is equal to or greater than the interpulse spacing Tmp'(=0.3T). Therefore, the bottom power level Pe' of the multi-pulse chain is higher than the erase power level Pe (Pe<Pe'). Thus, the bottom power level Pe' of the multi-pulse chain cannot be substantially equal to the erase power level Pe (Pe=Pe'). In this manner, the bottom power level Pe' of the multi-pulse chain varies depending on the pulse width Tmp. For this reason, if information recording is performed at a high transfer rate which makes it difficult to control the pulse width Tmp, the bottom power level Pe' cannot be controlled. As a result, it is not possible to form recording marks having an appropriate shape or width.

DISCLOSURE OF THE INVENTION

The present invention addresses the above-described problems by providing a method and apparatus for recording information onto an information recording medium by forming recording marks each having an appropriate shape or width, which is achieved by determining the bottom power level of a multi-pulse chain without varying a pulse width; and an information recording medium on which predetermined information is recorded.

According to one aspect of the present invention, an information recording method is provided, which comprises the steps of: (a) determining a power level of a pulse sequence; (b) generating the pulse sequence based on the power level determined; and (c) irradiating an information recording medium with light corresponding to the pulse sequence generated to record information represented by at least either a recording mark or a space onto the information recording medium. The pulse sequence comprises a multi-pulse chain for forming the recording mark. The multi-pulse chain comprises a plurality of pulses having a peak power level. In the step (a), a bottom power level is determined between the peak power level and an erase power level which is lower than the peak power level while keeping an interpulse spacing constant.

In one embodiment of this invention, the pulse sequence may comprise a starting pulse provided at a starting end of the pulse sequence, a terminating pulse provided at a terminating end of the pulse sequence, and the multi-pulse chain. The starting pulse may be used for forming a starting portion of the recording mark. The terminating pulse may be used for forming a terminating portion of the recording mark. The multi-pulse chain may be provided between the starting pulse and the terminating pulse, and the multi-pulse chain may be used for forming a substantially middle portion of the recording mark.

In one embodiment of this invention, the pulse width may be 0.5T where T represents a cycle of a recording clock.

In one embodiment of this invention, the step (a) may comprise the steps of: irradiating the information recording medium with light corresponding to a pulse sequence generated based on an initial power level to record test information represented by a test recording mark onto the information recording medium; reproducing a test signal from the recorded test information and detect an amplitude of the reproduced test signal; and determining the bottom power level based on the detected amplitude.

In one embodiment of this invention, the step (a) may comprise: irradiating the information recording medium with light corresponding to a pulse sequence generated based on an initial power level to record test information represented by a test recording mark onto the information recording medium; reproducing a test signal from the recorded test information and detect a jitter value of the reproduced test signal or a bit error rate of the reproduced test signal; and determining the bottom power level based on the detected jitter value or bit error rate.

In one embodiment of this invention, the step (a) may comprise: irradiating the information recording medium with light corresponding to a pulse sequence generated based on an initial power level to record test information represented by a test recording mark onto the information recording medium; reproducing a test signal from the recorded test information and detect a duty ratio of the reproduced test signal or an asymmetry value of the reproduced test signal; and determining the bottom power level based on the detected duty ratio or asymmetry value.

In one embodiment of this invention, the step (a) may comprise determining the erase power level, the peak power level, and the bottom power level in this order.

In one embodiment of this invention, the step (a) may comprise determining the peak power level based on the formula:

$$Pmb=k1 \times Pp$$

where Pmb represents the bottom power level, Pp represents the peak power level, and k1 represents a specific constant.

In one embodiment of this invention, the step (a) may comprise determining the erase power level based on the formula:

$$Pmb=k2 \times Pe$$

where Pmb represents the bottom power level, Pe represents the erase power level, and k2 represents a specific constant.

In one embodiment of this invention, the step (a) may comprise determining at least one of the peak power level and the erase power level based on the formula:

$$Pmb=Pe+k3 \times (Pp-Pe)$$

where Pmb represents the bottom power level, Pp represents the peak power level, Pe represents the erase power level, and k3 represents a specific constant.

In one embodiment of this invention, the step (a) may comprise determining at least one of the peak power level and the erase power level based on the formula:

$$Pmb=Pe+k4 \times (Pp+Pe)$$

where Pmb represents the bottom power level, Pp represents the peak power level, Pe represents the erase power level, and k4 represents a specific constant.

In one embodiment of this invention, the step (a) may comprise determining the power level of the pulse sequence based on the formula:

$$Pmbn=(Pmb2-Pmb1) \times (Vn-V1)/(V2-V1)+Pmb1$$

where Pmb1 represents a first bottom power level for a first linear velocity V1 of the information recording medium, Pmb2 represents a second bottom power level for a second linear velocity V2 of the information recording medium, and Pmbn represents the bottom power level for an arbitrary linear velocity Vn (V1<Vn<V2).

In one embodiment of this invention, the step (a) may comprise determining the power level of the pulse sequence based on the formula:

$$Pmbm=Pmb1 \times (Vm/V1)^{\alpha}$$

$$\alpha = \log(Pmb2/Pmb1)/\log(V2/V1)$$

where Pmb1 represents a first bottom power level for a first linear velocity V1 of the information recording medium, Pmb2 represents a second bottom power level for a second linear velocity V2 of the information recording medium, and Pmbm represents the bottom power level for an arbitrary linear velocity Vm (V1<Vm<V2).

In one embodiment of this invention, the first bottom power level Pmb1 may be previously optimized and recorded around a radially innermost periphery of the information recording medium, and the second bottom power level Pmb2 may be previously optimized and recorded around a radially outermost periphery of the information recording medium.

According to another aspect of the present invention, an information recording apparatus is provided, which comprises: means for determining a power level of a pulse sequence; means for generating the pulse sequence based on the power level determined; and means for irradiating an information recording medium with light corresponding to the pulse sequence generated to record information represented by at least either a recording mark or a space onto the information recording medium. The pulse sequence comprises a multi-pulse chain for forming the recording mark. The multi-pulse chain comprises a plurality of pulses having a peak power level. In the determining means, a bottom power level is determined between the peak power level and an erase power level which is lower than the peak power level while keeping an interpulse spacing constant.

In one embodiment of this invention, the pulse width may be 0.5T where T represents a cycle of a recording clock.

In one embodiment of this invention, the power level determining means may comprise: means for irradiating the information recording medium with light corresponding to a pulse sequence generated based on an initial power level to record test information represented by a test recording mark onto the information recording medium; means for reproducing a test signal from the recorded test information and detect an amplitude of the reproduced test signal; and means for determining the bottom power level based on the detected amplitude.

In one embodiment of this invention, the power level determining means may comprise: means for irradiating the information recording medium with light corresponding to a pulse sequence generated based on an initial power level to record test information represented by a test recording mark onto the information recording medium; means for reproducing a test signal from the recorded test information and detect a jitter value of the reproduced test signal or a bit error rate of the reproduced test signal; and means for determining the bottom power level based on the detected jitter value or bit error rate.

In one embodiment of this invention, the power level determining means may comprise: means for irradiating the information recording medium with light corresponding to a pulse sequence generated based on an initial power level to record test information represented by a test recording mark onto the information recording medium; means for reproducing a test signal from the recorded test information and detect a duty ratio of the reproduced test signal or an asymmetry value of the reproduced test signal; and means for determining the bottom power level based on the detected duty ratio or asymmetry value.

In one embodiment of this invention, the power level determining means may comprise determining the erase power level based on the formula:

$$Pmb = k2 \times Pe$$

where Pmb represents the bottom power level, Pe represents the erase power level, and k2 represents a specific constant.

In one embodiment of this invention, the power level determining means may comprise determining the power level of the pulse sequence based on the formula:

$$Pmbn = (Pmb2 - Pmb1) \times (Vn - V1)/(V2 - V1) + Pmb1$$

where Pmb1 represents a first bottom power level for a first linear velocity V1 of the information recording medium, Pmb2 represents a second bottom power level for a second linear velocity V2 of the information recording medium, and Pmbn represents the bottom power level for an arbitrary linear velocity Vn (V1<Vn<V2).

According to another aspect of the present invention, an information recording medium is provided, which comprises a recording region. A predetermined value for determining a power level of a pulse sequence is recorded in the recording region. The pulse sequence comprises a multi-pulse chain for forming a recording mark. The multi-pulse chain comprises a plurality of pulses having a peak power level. The predetermined value is at least one of a constant value indicating an interpulse spacing and a bottom power level determined between the peak power level and an erase power level which is lower than the peak power level.

According to another aspect of the present invention, an information recording medium is provided, which comprises a recording region. A predetermined value for determining a power level of a pulse sequence is recorded in the recording region. The pulse sequence comprises a multi-pulse chain for forming a recording mark. The multi-pulse chain comprises a plurality of pulses having a peak power level. The predetermined value is at least one constant value of k1, k2, k3 and k4, wherein k1, k2, k3, k4, Pmb, Pe and Pp satisfy at least one of the formulas:

$$Pmb = k1 \times Pp;$$

$$Pmb = k2 \times Pe;$$

$$Pmb = Pe + k3 \times (Pp - Pe); \text{ and}$$

$$Pmb = Pe + k4 \times (Pp + Pe)$$

where Pmb represents a bottom power level, Pp represents the peak power level, and Pe represents an erase power level which is lower than the peak power level, and the bottom power level is determined between the peak power level and the erase power level.

BRIEF DESCRIPTION OF THE DRAWINGS

FIG. 11 is a diagram for explaining the formation of a recording mark using a technique disclosed in Japanese Laid-Open Publication No. 2001-222819.

BEST MODE FOR CARRYING OUT THE INVENTION

Hereinafter, the present invention will be described by way of illustrative examples with reference to the accompanying drawings.

Figure 1:
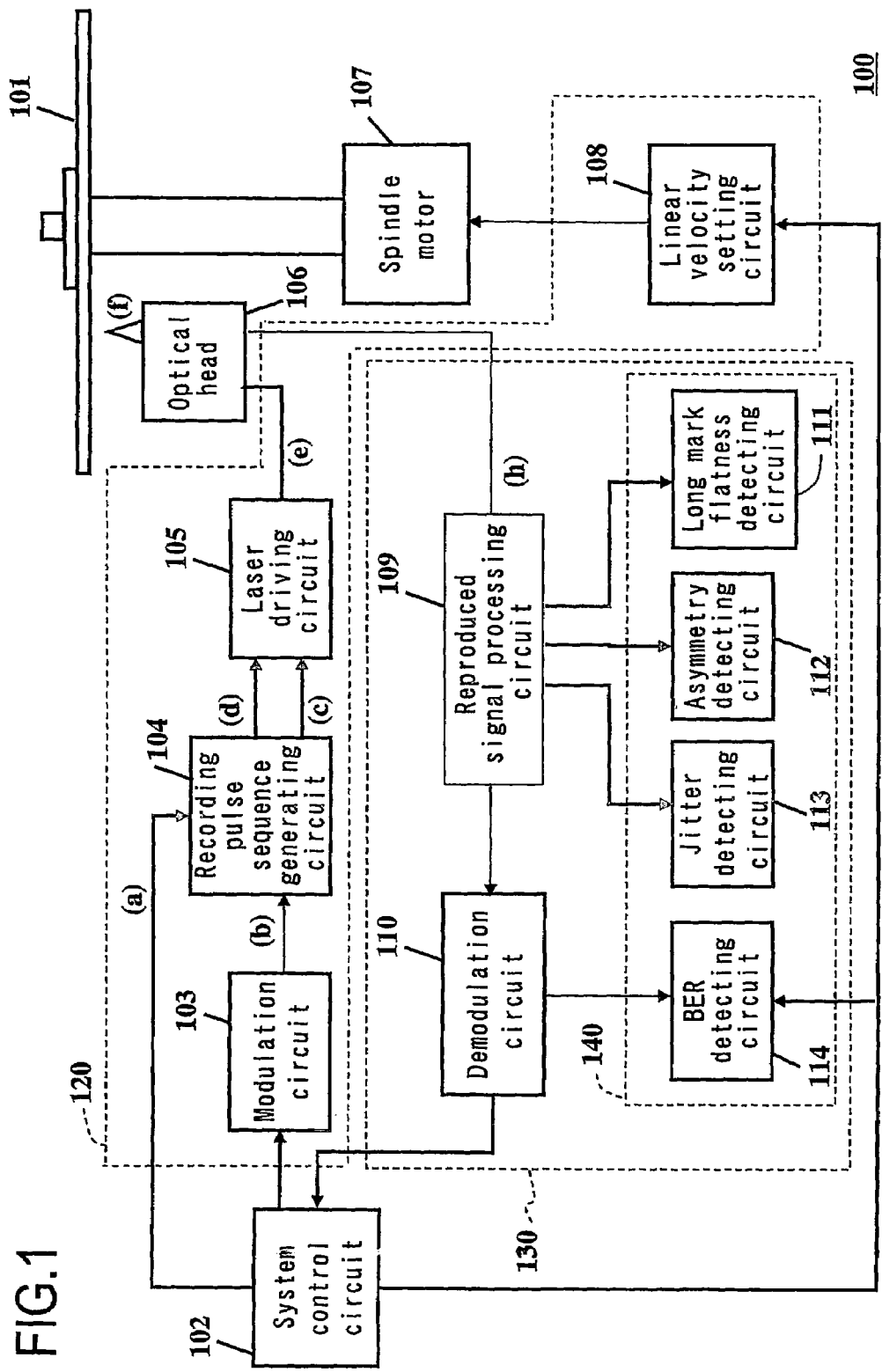
FIG. 1 is a diagram showing a configuration of an information recording apparatus according to an embodiment of the present invention.

FIG. 1 shows a configuration of an information recording apparatus 100 according to an embodiment of the present invention.

An information recording medium 101 (hereinafter referred to as an optical disc 101), which data is recorded onto or reproduced from, can be mounted into the information recording apparatus 100.

The information recording apparatus 100 comprises an optical head 106, a spindle motor 107, a system control circuit 102, a recording system circuitry 120, and a reproduction system circuitry 130.

The system control circuit 102 controls each component included in the information recording apparatus 100. The optical head 106 focuses semiconductor laser light. The optical disc 101 is irradiated with the focused light. The spindle motor 107 drives and rotates the optical disc 101.

The recording system circuitry 120 comprises a modulation circuit 103, a recording pulse sequence generating circuit 104, a laser driving circuit 105, and linear velocity setting circuit 108.

The modulation circuit 103 converts data to be recorded on the optical disc 101 to binary recording modulated codes. The recording pulse sequence generating circuit 104 generates a recording pulse sequence based on the recording modulated code. The laser driving circuit 105 drives a current of a semiconductor laser mounted on the optical head 106 based on the recording pulse sequence generated. The linear velocity setting circuit 108 controls the number of revolutions of the spindle motor 107 to determine the rotational linear velocity of the optical disc 101.

The reproduction system circuitry 130 comprises a reproduced signal processing circuit 109, a demodulation circuit 110, and a detection circuitry 140.

The reproduced signal processing circuit 109 processes a signal reproduced from the optical head 106 to render the reproduced signal into a binary form and reproduce the clock of the reproduced signal. The demodulation circuit 110 decodes the binary reproduced signal to obtain reproduced data. The detection circuitry 140 optimizes the bottom power level of a multi-pulse chain.

The detection circuitry 140 comprises a long mark flatness detecting circuit 111, an asymmetry detecting circuit 112, a jitter detecting circuit 113, and a BER detecting circuit 114.

The long mark flatness detecting circuit 111 detects the amplitude flatness of a long mark. The asymmetry detecting circuit 112 detects the asymmetry value of a reproduced signal. The jitter detecting circuit 113 detects the jitter value of a reproduced signal. The BER detecting circuit 114 detects the bit error rate of a reproduced signal.

Note that a one-chip LSI may include at least one of the recording system circuitry 120 and the reproduction system circuitry 130. A one-chip LSI may include the recording system circuitry 120, the reproduction system circuitry 130, and the system control circuit 102. When a one-chip LSI includes at least one of the recording system circuitry 120 and the reproduction system circuitry 130, or when a one-chip LSI includes both the recording system circuitry 120, the reproduction system circuitry 130, and the system control circuit 102, it is possible to facilitate the manufacturing process of the information recording apparatus 100.

Figure 2:
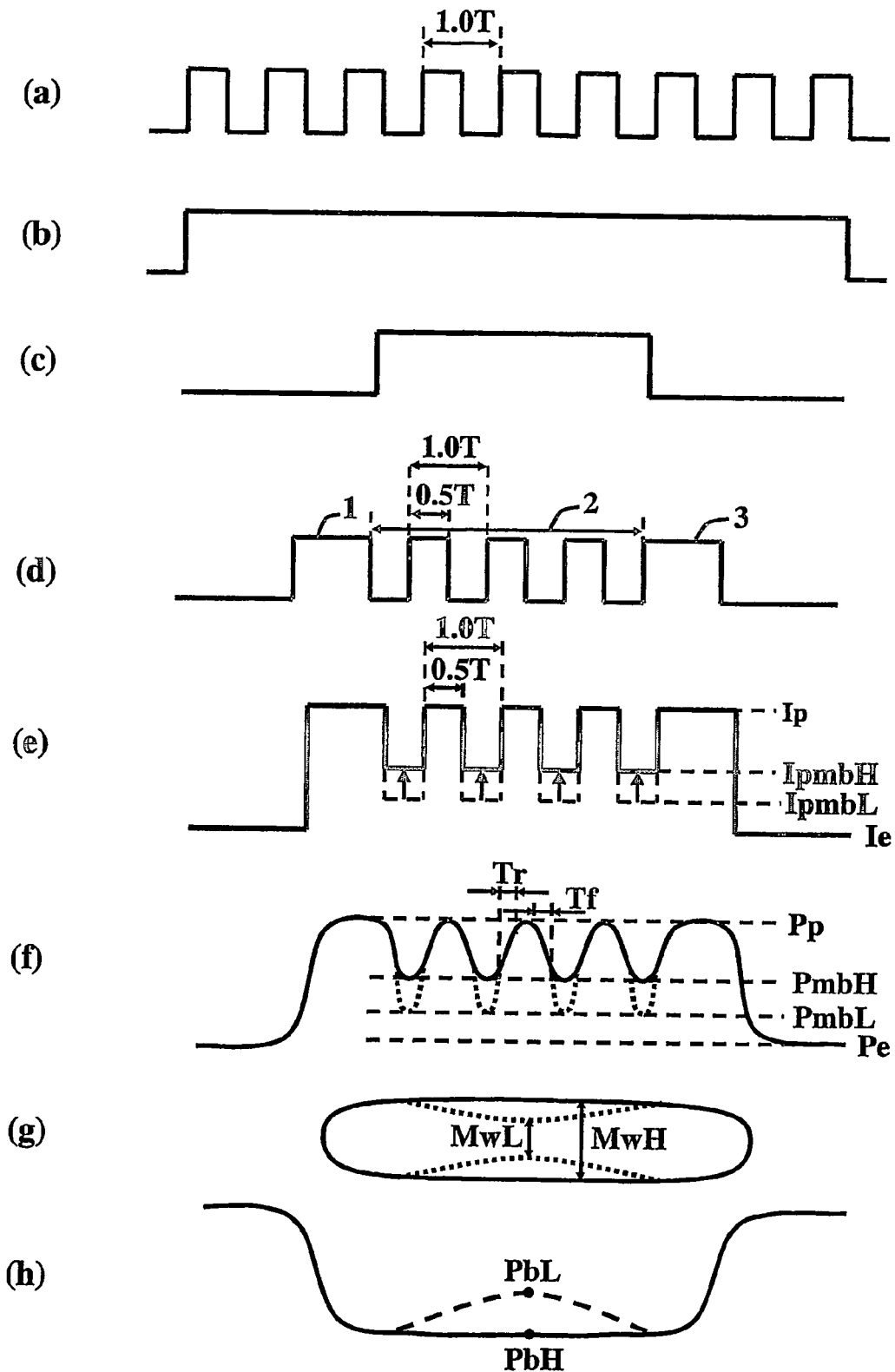
FIG. 2 is a diagram for explaining the formation of a recording mark according to an embodiment of the present invention.

FIG. 2 is a diagram for explaining the formation of a recording mark according to an embodiment of the present invention.

FIGS. 2(a) to 2(f) and 2(h) show signal waveforms which are measured at predetermined positions indicated by reference numerals (a) to (f) and (h) of the information recording apparatus 100 in FIG. 1.

FIG. 2(a) shows a channel clock having a cycle T.

FIG. 2(b) shows a modulated code output by the modulation circuit 103. The modulated code output by the modulation circuit 103 is input to the recording pulse sequence generating circuit 104.

FIG. 2(c) shows a signal for controlling the bottom power level of a multi-pulse chain. The bottom power level of a multi-pulse chain control signal is used to control the interval of the bottom power level of the multi-pulse chain.

FIG. 2(d) shows a recording pulse sequence. The recording pulse sequence comprises pulses for forming a recording mark. The recording pulse sequence comprises a starting pulse 1 and a terminating pulse 3, and a multi-pulse chain 2.

The starting pulse 1 is placed at a starting end of the recording pulse sequence. The starting pulse 1 is used to form a starting end portion of a recording mark. The terminating pulse 3 is placed at terminating end of the recording pulse sequence. The terminating pulse 3 is used to form a terminating portion of a recording mark. The multi-pulse chain 2 is placed between the starting pulse 1 and the terminating pulse 3. The multi-pulse chain 2 is used to form a substantially middle portion of a recording mark.

The multi-pulse chain 2 has a duty ratio of 50%. If the cycle of the channel clock is 1.0T, the pulse width (Tmp) of the high (H) level of the multi-pulse chain 2 and the interpulse spacing (Tmp') of the low (L) level of the multi-pulse chain 2 are each 0.5 T.

When the multi-pulse chain bottom power control signal shown in FIG. 2(c) and the recording pulse sequence shown in FIG. 2(d) are input to the laser driving circuit 105 (FIG. 1), a laser driving current is output as shown in FIG. 2(e). A semiconductor laser mounted on the optical head 106 (FIG. 1) is driven according to the laser driving current.

FIG. 2(e) shows the current levels of the laser driving current. The current levels of the laser driving current include a recording peak power current level Ip, an erase power current level Ie, and the bottom level (Ipmb) of the power current of a multi-pulse chain.

FIG. 2(f) shows a recording light emission waveform of light emitted by the semiconductor laser. The levels of the recording light emission waveform include a recording peak power level Pp corresponding to the recording peak power current level Ip, an erase power level Pe corresponding to the erase power current level Ie, and the bottom power level Pmb of a multi-pulse chain corresponding to the the bottom level of the power current of a multi-pulse chain Ipmb.

FIG. 2(g) shows the shape of a recording mark. This recording mark is formed on the optical disc 101 by irradiating an information layer (not shown) of the optical disc 101 with semiconductor laser light having the recording light emission waveform shown in FIG. 2(f).

FIG. 2(h) shows the amplitude of a reproduced signal. The reproduced signal is obtained by reproducing information represented by a recording mark. The recording mark is shown in FIG. 2(g).

Hereinafter, a laser control method for optimizing the width and shape of the recording mark and the reproduced signal waveform will be described.

A substantially middle portion of a recording mark are formed with the whole heat energy of the multi-pulse chain 2. Therefore, the heat energy applied to the middle portion can be controlled by adjusting the L power level of the multi-pulse chain 2, which is also referred to as the bottom power level (Pmb) of the multi-pulse chain 2. It is the technical idea of the present invention to control the width Mw of a substantially middle portion of a recording mark so as to obtain an appropriate form of the recording mark.

When the bottom level of a power current of a multi-pulse chain is IpmbL (FIG. 2(e)), the bottom power level of the multi-pulse chain is PmbL (FIG. 2(f)). In this case, when heat energy applied to a substantially middle portion of a recording mark is insufficient, the substantially middle portion of a recording mark become narrow as shown with dotted lines in FIG. 2(g) having a gap width of MwL. When information is reproduced from a recording mark having such a narrow middle portion (mark width: MwL), the amplitude of a reproduced waveform corresponding to the substantially middle portion has a lower amplitude (PbL) (FIG. 2(h)). When such a double-peak reproduced waveform is converted to a binary form, an appropriate recording modulated code length may not be obtained depending on the threshold conditions.

When the bottom level of the power current of a multi-pulse chain is IpmbH as shown with a dashed line in FIG. 2(e), the bottom power level of the multi-pulse chain is PmbH (FIG. 2(f)). In this case, the heat energy applied to a substantially middle portion of a recording mark is optimized, so that the substantially middle portion of the recording mark have a uniform width (MwH) as shown with a solid line in FIG. 2(g). When information is reproduced from a recording mark having such a uniform mark width (mark width: MwH), the amplitude of a reproduced waveform corresponding to the substantially middle portion maintains a high amplitude (PbH) as shown with a solid line in FIG. 2(h).

Thus, by changing the bottom power level (Pmb) of a multi-pulse chain, it is possible to obtain an appropriate width Mw of a substantially middle portion of a recording mark. Therefore, it is possible to suppress a reduction in the waveform amplitude Pb corresponding to the substantially middle portion of a recording mark. As a result, it is possible to reduce an error during the demodulation of a recording mark having a long recording modulated code length.

In the technique disclosed in Japanese Laid-Open Publication No. 2001-222819, the width Mw of a substantially middle portion of a recording mark is controlled by changing the pulse width Tmp. When information is recorded at a high transfer rate, the sum of the rising and falling times of a recording light emission waveform is equal to or greater than the interpulse spacing Tmp' (Tmp'=T−Tmp) of a multi-pulse chain. Therefore, the bottom power level Pe' of the multi-pulse chain is greater than the erase power level Pe (Pe<Pe'), the bottom power level Pe' and the erase power level Pe of the multi-pulse chain cannot be set to be the same level (Pe=Pe').

When information is recorded at a high transfer rate (e.g., using a laser having a recording light emission waveform), the rising and falling times of a recording light emission waveform driven by a laser driving circuit have to satisfy formulas (1) and (2) in order to obtain a power value corresponding to a high or low power level of a multi-pulse chain. Note that a light emission waveform corresponding to a multi-pulse chain at a high transfer rate can be approximated with a sine waveform.

$$Tr < \beta \times Tmp(\min) \quad (1)$$

$$Tf < \beta \times Tmp(\min) \quad (2)$$

where $\beta$ represents $\arcsin(0.8)/\arcsin(1.0)$ ($\simeq 0.59$); Tr represents the rising time of the light emission waveform during which the power value is changed from 10% of the L level to 90% of the H level; Tf represents the falling time of the light emission waveform during which the power value is changed from 90% of the H level to 10% of the L level; and Tmp(min) represents one of the pulse width (at the H level of the multi-pulse chain) and the interpulse spacing (at the L level of the multi-pulse chain), which is smaller.

In Japanese Laid-Open Publication No. 2001-222819, the multi-pulse width Tmp is in the range of 0.50<Tmp<0.75, Tmp(min) is 0.25T. However, in the embodiment of the present invention, Tmp is fixed to 0.50T, and therefore, Tmp(min) is 0.50T.

In this embodiment of the present invention, Tmp(min) is two times higher than that in the technique described in Japanese Laid-Open Publication No. 2001-222819. Therefore, the power can be obtained using a light emission waveform having Tr and Tf which are two times greater than when Tmp(min) is 0.25T. Thus, the embodiment of the present invention in which Tmp is fixed to be around a duty ratio of 50% is compared with Japanese Laid-Open Publication No. 2001-222819 in which Tmp is variable. In other words, in the embodiment of the present invention, the width of a recording mark is adjusted by controlling the bottom power level of a multi-pulse chain, while in the conventional technique, the width of a recording mark is adjusted by changing Tmp. Assuming that the high transfer rate is the same, if the rising and falling times of a recording light emission waveform in the embodiment of the present invention are two times longer than that of the conventional technique, the bottom power level of a multi-pulse chain can be set to be between predetermined H and L power levels.

The embodiment of the present invention has been heretofore described with reference to FIGS. 1 and 2.

For example, in the embodiment of the present invention shown in FIGS. 1 and 2, the system control circuit 102, the modulation circuit 103, the recording pulse sequence generating circuit 104, and the laser driving circuit 105 constitute a means for setting the bottom power level between the peak power level and the erase power level which is lower than the peak power level, while keeping the interpulse spacing constant (pulse sequence power level setting means). The system control circuit 102, the recording pulse sequence generating circuit 104, and the laser driving circuit 105 constitute a means for generating a pulse sequence based on a determined power level (pulse sequence generating means). The system control circuit 102, the laser driving circuit 105, and the optical head 106 constitute a means for irradiating a recording medium with light corresponding to a generated pulse sequence to record information represented by at least one of a recording mark and a space onto the recording medium (recording means). The recording pulse sequence corresponds to a "pulses comprising a multi-pulse chain for forming a recording mark". The multi-pulse chain 2 corresponds to a "multi-pulse chain comprising a plurality of pulses having a peak power level".

However, the present invention is not limited to the information recording apparatus 100 of FIGS. 1 and 2. The above-described means, i.e., "means for determining a power level of a pulse sequence, wherein a bottom power level is determined between a peak power level and an erase power level which is lower than the peak power level while keeping the interpulse spacing constant", "means for generating a pulse sequence based on the determined power level", and "means for irradiating a recording medium with light corresponding to the generated pulse sequence to record information represented by at least one of a recording mark and a space onto the recording medium", can be embodied using any components, such as devices, circuits, and the like, as long as they have the desired functions. Any pulse sequence can be used herein as long as it is a "pulse sequence comprising a multi-pulse chain for forming a recording mark" or a "multi-pulse chain comprising a plurality of pulses having a peak power level".

According to the information recording apparatus of the present invention, the bottom power level can be determined to be between the peak power level and the erase power level which is lower than the peak power level, while keeping the interpulse spacing constant. Therefore, the bottom power level of a multi-pulse chain can be determined while keeping the pulse width constant, it is possible to determine the bottom power level, even when information is recorded at a high transfer rate so that it is difficult to control the pulse width. As a result, a recording mark having an appropriate shape and width can be formed, i.e., it is possible to record information represented by such a recording mark onto an information recording medium.

According to the information recording apparatus of the present invention, it is possible to solve the conventional problem that when information is recorded at a high transfer rate so that the rising time and the falling time of a recording light emission waveform are not sufficient for driving the multi-pulse width Tmp, the mark width of the middle portion of a recording mark is narrow. As a result, it is possible to obtain an appropriate mark width of the middle portion of a recording mark. Thereby, information represented by a high-quality signal with less bit error can be stably recorded onto an information recording medium.

According to the information recording apparatus of the present invention, the optimum value of the bottom power level can be determined by calculation. Therefore, the present invention can be used in applications in which the relative speed of an information layer of an information recording medium to a light beam emitted by an optical head (so-called linear velocity) is changed (e.g., CAV recording). As a result, it is possible to appropriately access the information recording medium.

Figure 3:
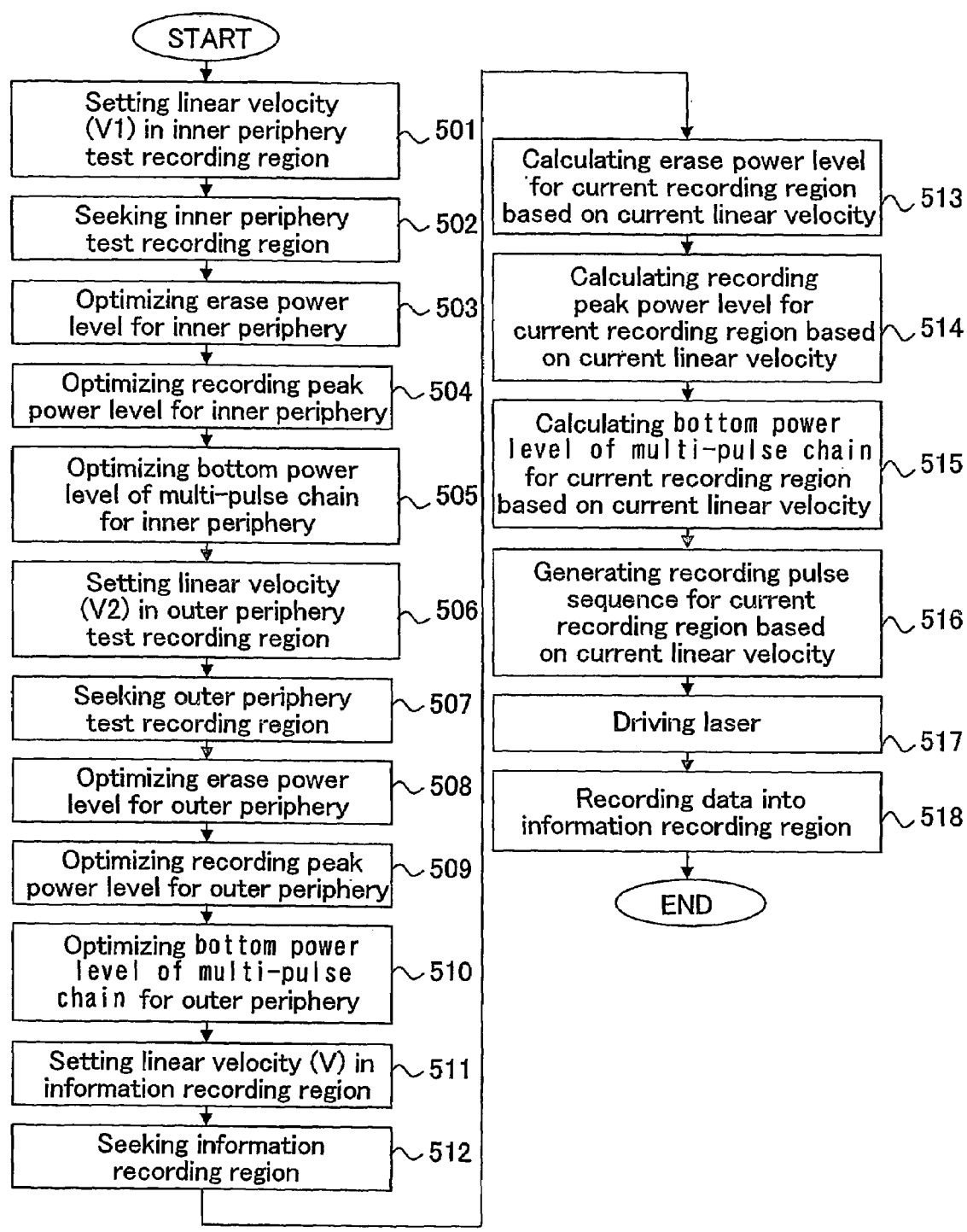
FIG. 3 is a flowchart showing a procedure for recording information according to an embodiment of the present invention.

FIG. 3 shows a procedure for recording information according to an embodiment of the present invention.

Hereinafter, the information recording procedure will be described with reference to FIGS. 1 and 3 step by step.

The information recording procedure comprises: a power level optimizing step in an inner periphery test recording region of a recording medium (steps 501 to 505); a power level optimizing step in an outer periphery test recording region (step 506 to step 510); a power level determining step in a recording region (steps 511 to 515); a recording pulse sequence generating step (step 516); and an information recording step (steps 517 and 518).

The power level optimizing step in an inner periphery test recording region (steps 501 to 505), the power level optimizing step in an outer periphery test recording region (steps 506 to 510), and the power level determining step in a recording region (steps 511 to 515) are carried out by, for example, the system control circuit 102, the modulation circuit 103, the recording pulse sequence generating circuit 104, and the laser driving circuit 105.

The recording pulse sequence generating step (step 516) is carried out by, for example, the system control circuit 102, the recording pulse sequence generating circuit 104, and the laser driving circuit 105.

The information recording step (steps 517 and 518) is carried out by, for example, the system control circuit 102, the laser driving circuit 105, and the optical head 106.

Hereinafter, the power level optimizing step in an inner periphery test recording region will be described.

In step 501: the rotational speed of spindle motor 107 is set so as to obtain a linear velocity (V1) of the inner periphery test recording region. The inner periphery test recording region is allocated in an inner peripheral portion of the optical disc 101.

In step 502: an optical head moving apparatus (not shown) is used to control the optical head 106 to seek the inner periphery test recording region, so that an information recording position is determined in the inner periphery test recording region.

In step 503: the erase power level Pe is optimized for the inner periphery test recording region as follows, for example: (A) the erase power characteristics of the jitter value of a recording/reproduced signal is measured, and the erase power level is set in a substantially middle of the margin of the erase power; or (B) an erase power level recommended for the inner periphery, which is previously recorded on the optical disc 101, is used without change.

In step 504: the recording peak power level Pp is optimized for the inner periphery test recording region as follows, for example: (A) the peak power characteristics of the jitter value of a recording/reproduced signal is measured, and a recording peak power level is set in a substantially middle portion of the margin of the recording peak power; or (B) a recording peak power level recommended for the inner periphery, which is previously recorded on the optical disc 101, is used without change.

In step 505: the bottom power level Pbm of a multi-pulse chain is optimized for the inner periphery test recording region as described below with reference to FIGS. 6 to 8.

Hereinafter, the power level optimizing step in an outer periphery test recording region will be described.

In step 506: the rotational speed of the spindle motor 107 is set so as to obtain a predetermined linear velocity (V2) of the outer periphery test recording region. The outer periphery test recording region is allocated in an outer peripheral portion of the optical disc 101.

In step 507: the optical head moving apparatus is used to control the optical head 106 to seek the outer periphery test recording region, so that an information recording position is determined in the outer periphery test recording region.

In step 508: the erase power level Pe is optimized for the outer periphery test recording region as follows, for example: (A) the erase power characteristics of the jitter value of a recording/reproduced signal is measured, and the erase power level is set in a substantially middle of the margin of the erase power; or (B) an erase power level recommended for the outer periphery, which is previously recorded on the optical disc 101, is used without change.

In step 509: the recording peak power level Pp is optimized for the outer periphery test recording region as follows, for example: (A) the peak power characteristics of the jitter value of a recording/reproduced signal is measured, and a recording peak power level is set in a substantially middle portion of the margin of the recording Peak power; or (B) a recording peak power level recommended for the outer periphery, which is previously recorded on the optical disc 101, is used without change.

In step 510: the bottom power level Pbm of a multi-pulse chain is optimized for the outer periphery test recording region using the method for optimizing the bottom power level Pbm of a multi-pulse chain for the inner periphery test recording region.

Hereinafter, the power level determining step in a recording region will be described.

In step 511: the rotational speed of the spindle motor 107 is set so as to obtain a linear velocity (V) of a recording region. The recording region is allocated between the inner periphery test recording region and the outer periphery test recording region of the optical disc 101.

In step 512: the optical head moving apparatus (not shown) is used to control the optical head 106 to seek the recording region, so that an information recording position is determined in the recording region.

In step 513: an erase power level is calculated based on the linear velocity (V) at the current position in the recording region.

In step 514: a recording peak power level is calculated based on the linear velocity (V) at the current position in the recording region.

In step 515: the bottom power level of a multi-pulse chain is calculated to fall between the recording peak power level and the erase power level, based on the linear velocity (V) at the current position in the recording region, while keeping the interpulse spacing constant.

Heretofore, the steps for determining the power levels of a recording pulse sequence have been described (steps 501 to 515).

In step 516: a recording pulse sequence is generated based on the linear velocity V (V1<V<V2). For example, the recording pulse sequence is generated by changing the width Tmp of a recording pulse in an inverse proportional to the linear velocity V. Note that the duty of the pulse width Tmp is fixed to about 50%.

Hereinafter, an information recording step will be described.

By performing steps 517 and 518, the optical disc 101 is irradiated with light corresponding to the pulse sequence generated, information represented by at least either a recording mark or a space is recorded onto the optical disc 101.

In step 517: the recording pulse sequence generated is input to the laser driving circuit 105, which in turn drives a semiconductor laser apparatus mounted on the optical head 106. The semiconductor laser apparatus emits light corresponding to the generated pulse sequence.

In step 518: information represented by at least either a recording mark or a space is recorded into the recording region of the optical disc 101. Thereafter, the information recording procedure is ended.

The embodiment of the present invention has been heretofore described with reference to FIG. 3.

For example, in the embodiment of the present invention shown in FIG. 3, steps 501 to 515 correspond to the "step of determining a power level of a pulse sequence, wherein the bottom power level is determined between the peak power level and the erase power level which is lower than the peak power level while keeping the interpulse spacing constant"; step 516 corresponds to the "step of generating a pulse sequence based on the determined power level"; and steps 517 and 518 correspond to the "step of irradiating a recording medium with light corresponding to a generated pulse sequence to record information represented by at least either a recording mark or a space onto the recording medium". The recording pulse sequence corresponds to a "pulse sequence comprising a multi-pulse chain for forming a recording mark". The multi-pulse chain 2 corresponds to a "multi-pulse chain comprising a plurality of pulses having a peak power level".

However, the present invention is not limited to the information recording procedure of the embodiment of the present invention shown in FIG. 3. The above-described steps, i.e., "determining a power level of a pulse sequence, wherein a bottom power level is determined between a peak power level and an erase power level which is lower than the peak power level while keeping the interpulse spacing constant", "generating a pulse sequence based on the determined power level", and "irradiating a recording medium with light corresponding to the generated pulse sequence to record information represented by at least one of a recording mark and a space onto the recording medium" can be embodied using any components, such as devices, circuits, and the like, as long as they have the desired functions. Any pulse sequence can be used herein as long as it is a "pulse sequence comprising a multi-pulse chain for forming a recording mark" or a "multi-pulse chain comprising a plurality of pulses having a peak power level".

Hereinafter, a method for optimizing the bottom power level Pmb of a multi-pulse chain for the inner periphery test recording region (the detail of step 505) will be described with reference to FIGS. 4 to 6. With this method, an optimized first bottom power level Pmo of a multi-pulse chain is determined.

Figure 4:
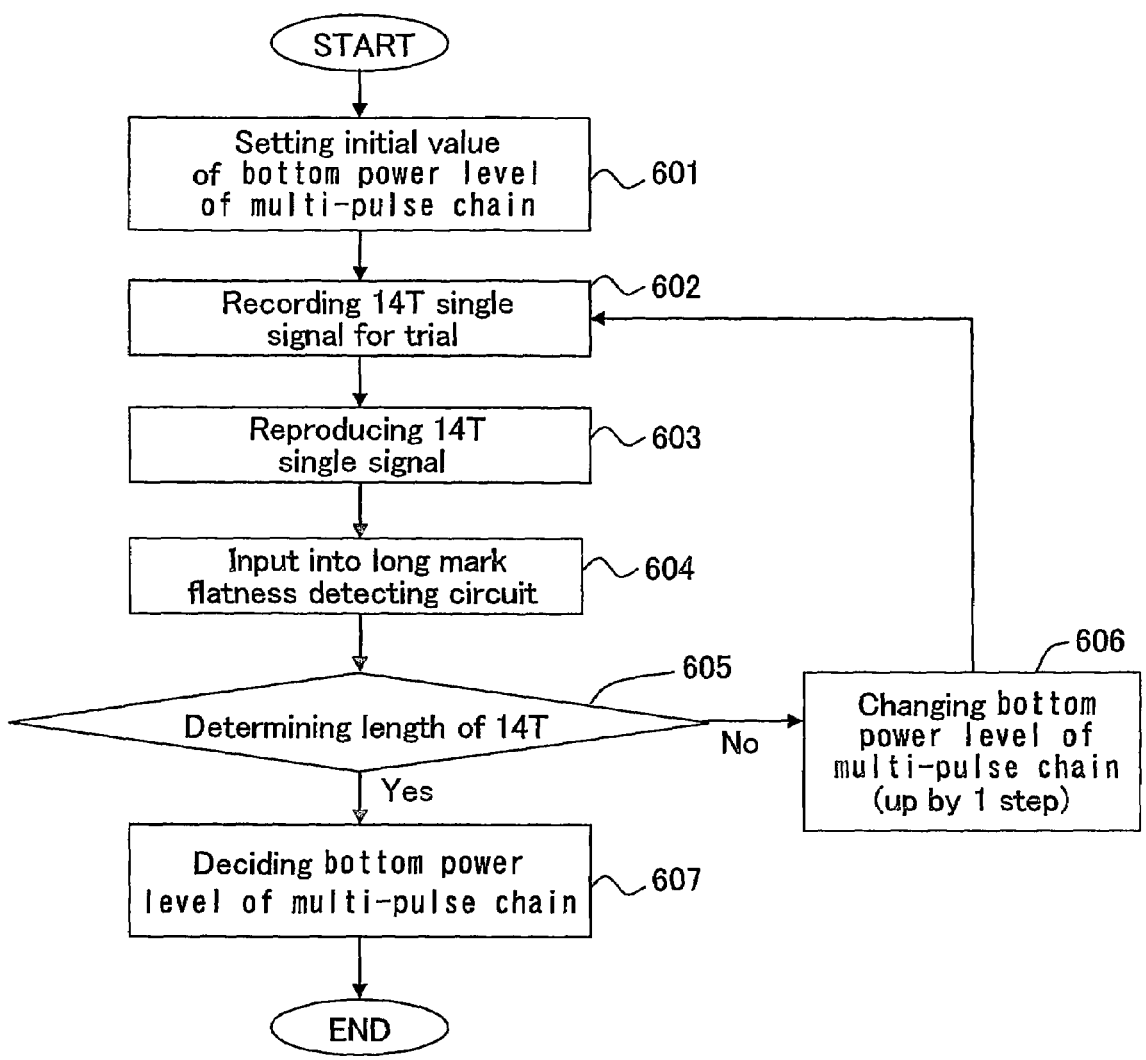
FIG. 4 is a flowchart showing a procedure for determining an optimized first bottom power level Pmo of a multi-pulse chain.

FIG. 4 shows a procedure for determining the optimized first bottom power level Pmo of a multi-pulse chain (also referred to as a "Pmo determining procedure").

Hereinafter, the Pmo determining procedure will be described with reference to FIG. 4 step by step.

In step 601: the bottom power level of a multi-pulse chain is set to be an initial value Pmbi. The initial value Pmbi of the bottom power level of a multi-pulse chain is set to be, for example, about the erase power level Pe.

In step 602: the optical disc 101 is irradiated with light corresponding to a recording pulse sequence having Pmbi to record a 14T single signal onto the optical disc 101 on a trial basis.

In step 603: the 14T single signal is reproduced.

In step 604: the reproduced 14T single signal is input to the long mark flatness detecting circuit 111. The function of the long mark flatness detecting circuit 111 will be described in detail below with reference to FIGS. 5 and 6.

In step 605: the long mark flatness detecting circuit 111 detects the waveform of the reproduced 14T single signal. Further, the long mark flatness detecting circuit 111 determines whether or not the waveform of the reproduced 14T single signal is flat.

If the result of the determination is "No", the process goes to step 606.

If the result of the determination is "Yes", the process goes to step 607.

In step 606: the bottom power level Pmb of a multi-pulse chain is increased by one step (e.g., 0.5 mW). Thereafter, the process goes to step 602.

By repeating steps 602 to 606, the bottom power level of a multi-pulse chain is increased from the initial value Pmbi to the optimum value Pmbo, heat energy applied to a substantially middle portion of a recording mark is optimized.

In step 607: the bottom power level of a multi-pulse chain is decided to the optimum value Pmbo, i.e., the optimized first bottom power level Pmbo of a multi-pulse chain is decided. Thereafter, the process is ended.

Thus, a 14T single signal is recorded onto the optical disc 101 and the waveform of the 14T single signal is detected while changing the bottom power level Pmb of a multi-pulse chain. Thereby, in step 505 (FIG. 3), the bottom power level Pmb of a multi-pulse chain can be optimized.

Hereinafter, a function of the long mark flatness detecting circuit 111 will be described in detail with reference to FIGS. 5 and 6.

Figure 5:
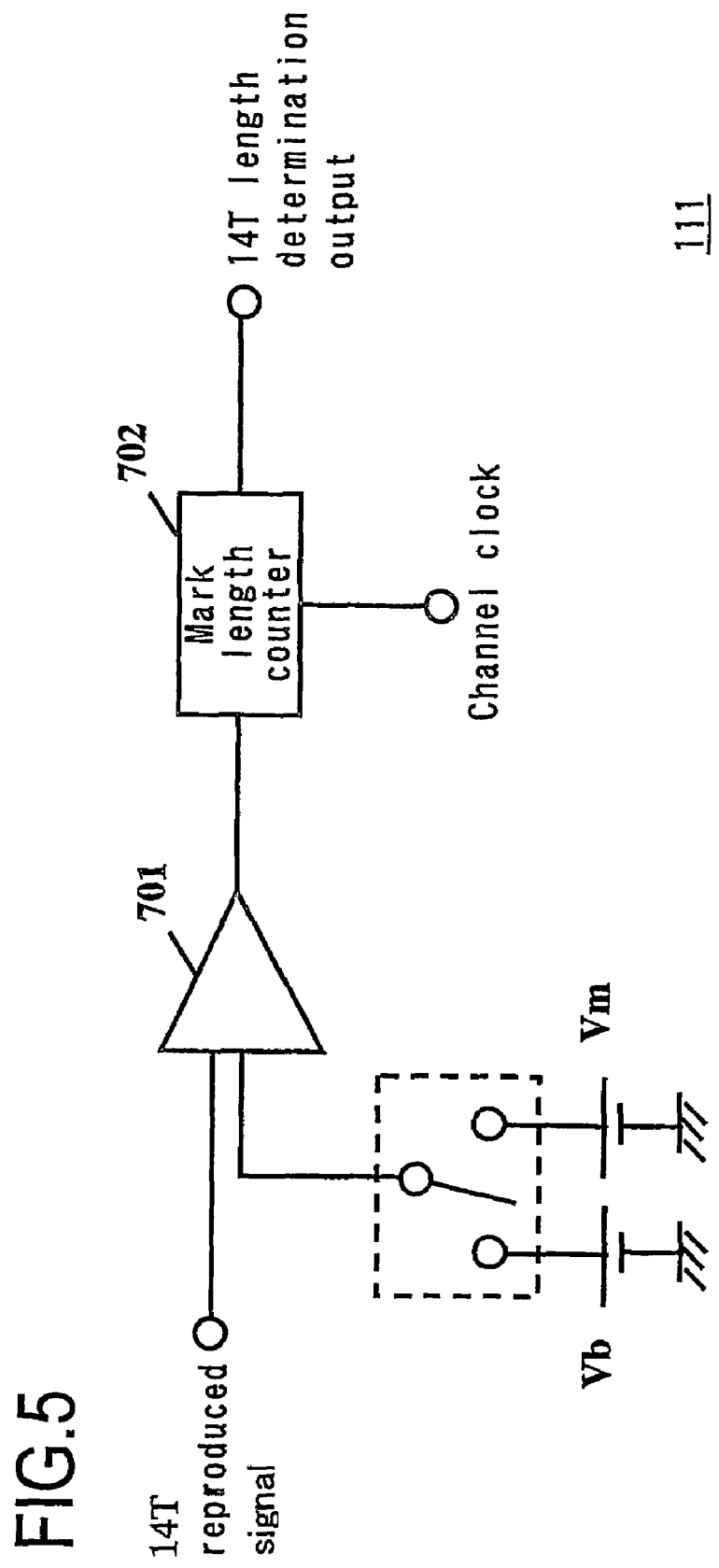
FIG. 5 is a diagram showing a configuration of a long mark flatness detecting circuit.

FIG. 5 shows a configuration of the long mark flatness detecting circuit 111.

The long mark flatness detecting circuit 111 comprises a comparator 701 and a mark length counter 702. A reproduced 14T signal is input to the long mark flatness detecting circuit 111.

The comparator 701 compares the reproduced 14T signal with a base comparative voltage Vb, and compares the reproduced 14T signal with a mark flatness detection voltage Vm. Based on the result of the comparison, the comparator 701 outputs a binary signal to the mark length counter 702.

The mark length counter 702 determines the time length of a mark, which is represented by the binary signal output by the comparator 701, by counting channel clocks. The mark length counter 702 outputs a 14T length determination signal indicating whether or not the waveform of the reproduced 14T single signal is flat.

Figure 6:
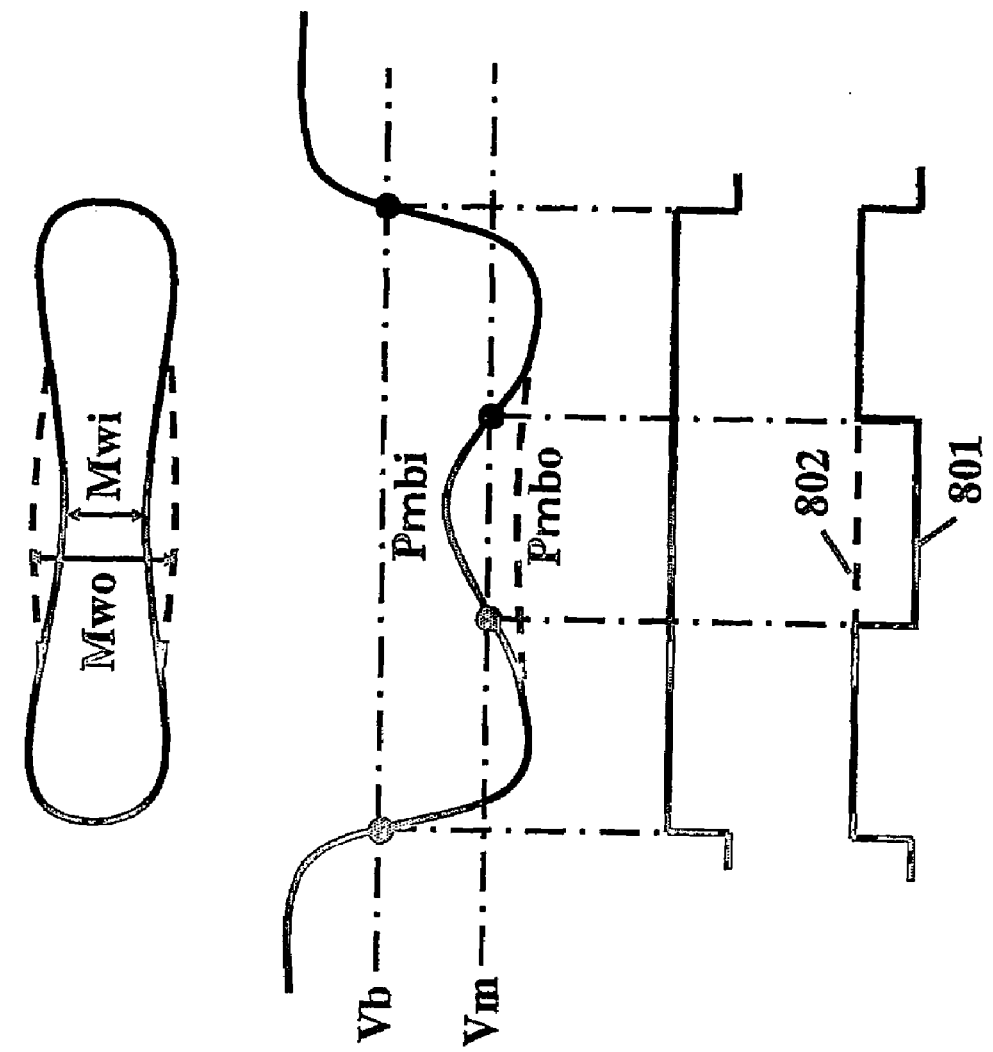
FIG. 6 is a diagram for explaining a signal waveform to be determined by the long mark flatness detecting circuit of FIG. 5.

FIG. 6 is a diagram for explaining a signal waveform to be determined by the long mark flatness detecting circuit 111.

FIG. 6(a) shows the shape of a 14T length recording mark which is formed in step 602.

When the bottom power level of a multi-pulse chain is the initial value Pmbi, heat energy applied to a substantially middle portion of a recording mark is insufficient. In this case, the substantially middle portion of a recording mark is narrow (e.g., width: Mwi).

FIG. 6(b) shows a reproduced waveform having a reduced amplitude around the middle portion thereof. If information is reproduced from such a recording mark (width: Mwi), a reproduced waveform having a reduced amplitude (Pmbi) around the middle portion thereof is generated.

FIG. 6(c) shows a binary signal, which is generated based on the result of comparison between the reproduced 14T signal waveform Pmbi and the base comparative voltage Vb.

FIG. 6(d) shows a binary signal, which is generated based on the result of comparison between the reproduced 14T signal waveform Pmbi and the mark flatness detection voltage Vm.

The reproduced 14T waveform corresponding to the bottom power level Pmbi of a multi-pulse chain (reproduced 14T waveform having a reduced waveform amplitude) is compared with the mark flatness detection voltage Vm. As a result, it is determined that the level around the middle portion is low (L level) (801) and the waveform of the reproduced 14T single signal is not flat.

When information is reproduced from a recording mark having a uniform mark width of Mwo at a substantially middle portion of the recording mark, a reproduced 14T waveform corresponding to the bottom power level Pmbo of a multi-pulse chain is generated, which has a less reduced waveform amplitude. When the reproduced 14T waveform corresponding to the bottom power level Pmbo of a multi-pulse chain is compared with the mark flatness detection voltage Vm, it is determined that the 14T single signal reproduced has a flat waveform. When the mark flatness detection voltage Vm was used as a threshold in the comparator 701 to generate a binary 14T reproduced waveform, the resultant binary signal is the same as the binary signal obtained using the base comparative voltage Vb as threshold (FIG. 6(c)) as indicated by 802 in FIG. 6(d).

Note that in the embodiment of the present invention, the flatness of a reproduced waveform is detected in order to optimize the bottom power level Pmb of a multi-pulse chain. The present invention is not limited to the detection of the flatness of a reproduced waveform. For example, (A) the bottom power level Pmb of a multi-pulse chain may be optimized by controlling the asymmetry detecting circuit 112 (FIG. 1) to obtain an optimum asymmetry value previously determined for a recording medium, (B) the bottom power level Pmb of a multi-pulse chain is optimized by controlling the jitter detecting circuit 113 (FIG. 1) to obtain a recording/reproduced signal having a substantially minimum jitter value, or (c) the bottom power level Pmb of a multi-pulse chain is optimized by controlling the bit error rate (BER) detecting circuit 114 (FIG. 1) to obtain a recording/reproduced signal having a substantially minimum bit error rate.

In the embodiment of the present invention, the bottom power level Pmb of a multi-pulse chain is determined by performing test recording in step 505 (FIG. 3). However, the bottom power level Pmb of a multi-pulse chain can be determined without utilizing test recording. Alternatively, the bottom power level Pmb of a multi-pulse chain may be calculated from the erase power level Pe determined in step 503 (FIG. 3) and the recording peak power level Pp determined in step 504 (FIG. 3). This is supported by the empirical result that when information media have the same structure, a substantially optimum value of the bottom power level Pmb of a multi-pulse chain can be calculated if the erase power level Pe and the recording peak power level Pp have been determined.

Figure 7:
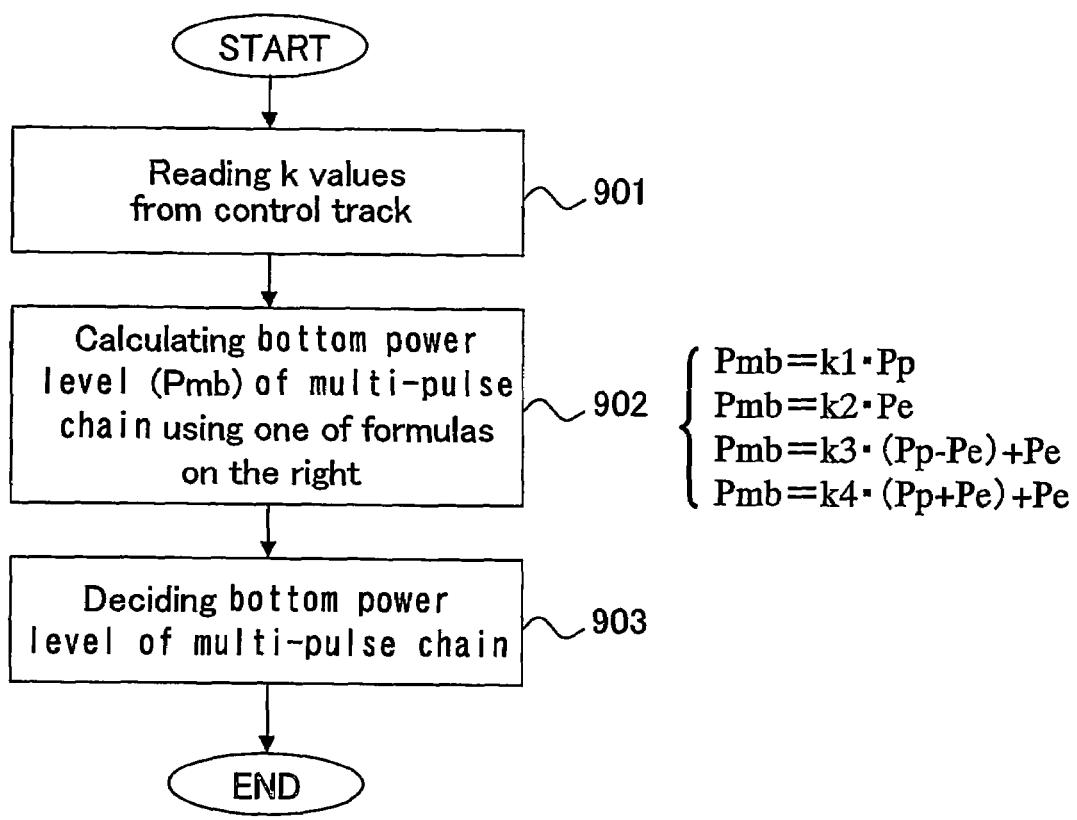
FIG. 7 is a flowchart showing a procedure for determining a bottom power level Pmb of a multi-pulse chain by calculating an erase power level Pe and a recording peak power level Pp.

FIG. 7 shows a procedure for determining the bottom power level Pmb of a multi-pulse chain by calculating the erase power level Pe and the recording peak power level Pp.

Hereinafter, the Pmb determining procedure will be described step by step with reference to FIG. 7.

In step 901: parameter k values required for the calculation of Pmb are read. The parameter k values are previously recorded in, for example, a control track region of the optical disc 101. For example, the k values (k1 to k4) may be calculated based on Pmb previously determined by a disc manufacturer as described in FIG. 4, Pp and Pe. For example, at least one of Pmb previously determined by a disc manufacturer as described in FIG. 4, Pp, Pe, k values (k1 to k4), and a constant value indicating the pulse width of a multi-pulse chain, may be recorded on the optical disc 101. At least one of the determined Pmb, Pp, Pe, k values (k1 to k4), and a constant value indicating the pulse width of a multi-pulse chain is recorded in, for example, a lead-out region allocated in the optical disc 101.

Note that k values (k1 to k4) to be recorded onto the optical disc 101 are calculated based on any one of formulas (i) to (iv), depending on the heat energy dependency of the width of a recording mark at a substantially middle portion thereof on the optical disc 101.

(1) When the recording peak power level Pp has a great influence on heat energy which determines the width of a substantially middle portion of a recording mark, k values are calculated based on formula (i).

$$Pmb = k1 \times Pp \quad (i)$$

(2) When the erase power level Pe has a great influence on heat energy which determines the width of a substantially middle portion of a recording mark, k values are calculated based on formula (ii).

$$Pmb = k2 \times Pe \quad (ii)$$

(3) When the difference between the recording peak power level Pp and the erase power level Pe has a great influence on heat energy which determines the width of a substantially middle portion of a recording mark, k values are calculated based on formula (iii).

$$Pmb = k3 \times (Pp - Pe) + Pe \quad (iii)$$

(4) When the sum of the recording peak power level Pp and the erase power level Pe has a great influence on heat energy which determines the width of a substantially middle portion of a recording mark, k values are calculated based on formula (iv).

$$Pmb = k4 \times (Pp + Pe) + Pe \quad (iv)$$

In step 902: the bottom power level Pmb of a multi-pulse chain is calculated based on any one of formulas (i) to (iv).

It can be easily determined based on which of formulas (i) to (iv) the bottom power level Pmb of a multi-pulse chain is calculated. For example, an erase power margin which is a property of a recording/reproduction jitter value with respect to a change in the erase power level Pe, or a recording peak power margin which is a property of a recording/reproduction jitter value with respect to a change in the recording peak power level Pp, is measured for each formula to select the formula that has the greatest margin width.

In step 903: based on the result of calculation of the formula, the bottom power level Pmb of a multi-pulse chain is determined. The process is ended.

Hereinafter, a method for calculating a power level required in step 513, 514 and 515 (FIG. 3) will be described below.

Figure 8:
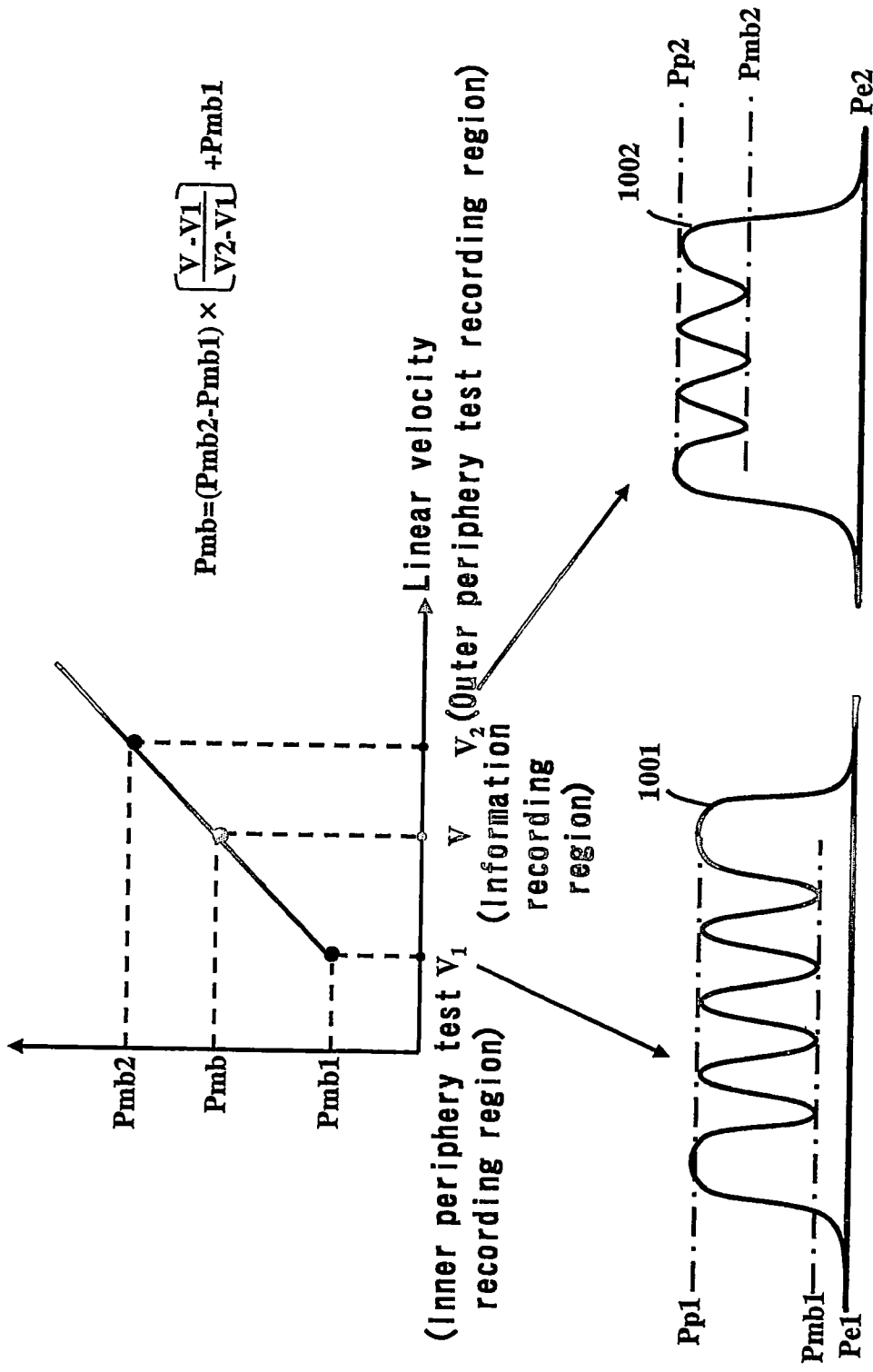
FIG. 8 is a diagram for explaining a first method for calculating the bottom power level Pmb of a multi-pulse chain for an arbitrary linear velocity V.

FIG. 8 is a diagram for explaining a first method for calculating the bottom power level Pmb of a multi-pulse chain for an arbitrary linear velocity V.

Pmb1 represents the bottom power level of a multi-pulse chain which is optimized with respect to the linear velocity V1 of the inner periphery test region in step 505 (FIG. 3). Pmb2 represents the bottom power level of a multi-pulse chain which is optimized with respect to the linear velocity V2 of the outer periphery test region in step 510 (FIG. 3). A waveform 1001 is a recording light emission waveform at the linear velocity V1, while a waveform 1002 is a recording light emission waveform at the linear velocity V2.

The bottom power level Pmb of a multi-pulse chain, at an arbitrary linear velocity V in the information recording region between the linear velocity V1 of the inner periphery test region, and the linear velocity V2 of the outer periphery test region, is determined based on the linear velocity vs. power sensitivity characteristics of a material for the optical disc 101. For example, when the optical disc 101 is a phase-change information medium, heat energy for determining the width of a substantially middle portion of a recording mark is decreased as the linear velocity V is increased. In this case, the optimum value of Pmb is also increased with a decrease in the heat energy.

The first method can be applicable when the linear velocity vs. power sensitivity characteristics of the material increases substantially linearly. For an arbitrary linear velocity V, the bottom power level Pmb of a multi-pulse chain can be determined based on formula (3).

$$Pmbn=(Pmb2-Pmb1)\times(Vn-V1)/(V2-V1)+Pmb1 \qquad (3)$$

Figure 9:
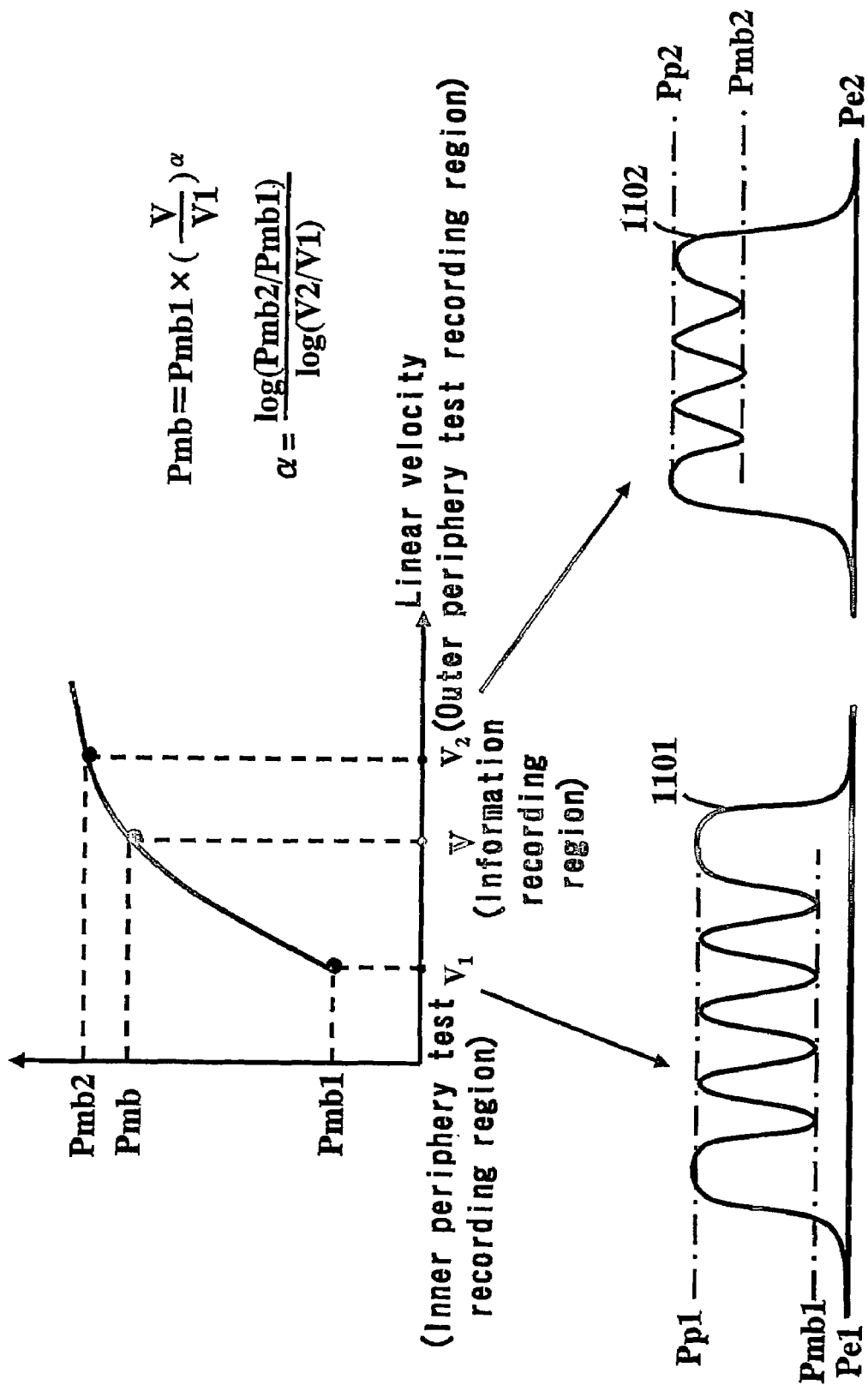
FIG. 9 is a diagram for explaining a second method for calculating the bottom power level Pmb of a multi-pulse chain for an arbitrary linear velocity V.
Figure 10:
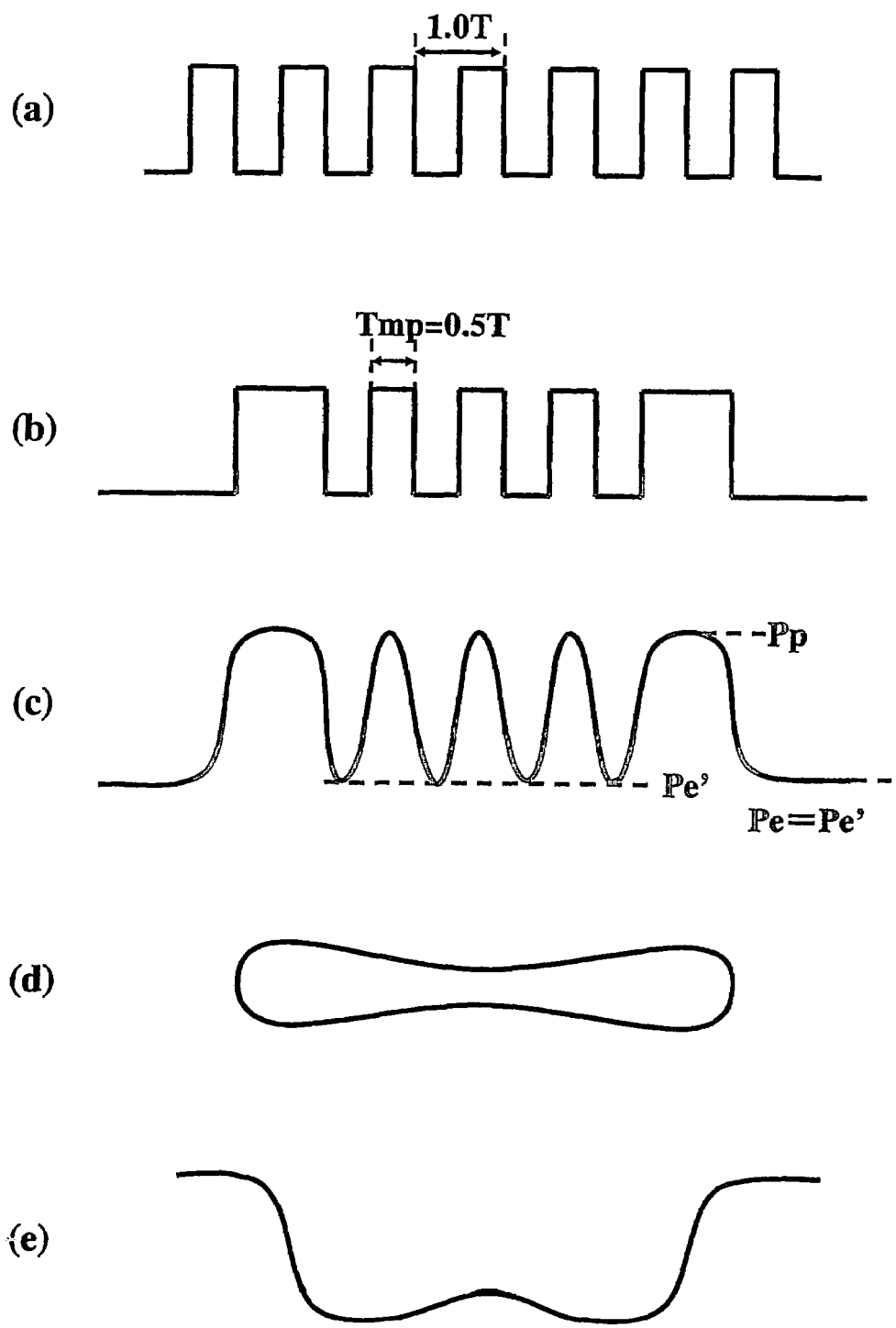
FIG. 10 is a diagram for explaining the formation of an inappropriate recording mark.

FIG. 9 is a diagram for explaining a second method for calculating the bottom power level Pmb of a multi-pulse chain for an arbitrary linear velocity V.

Pmb1 represents the bottom power level of a multi-pulse chain which is optimized for the linear velocity V1 of the inner periphery test region in step 505 (FIG. 3). Pmb2 represents the bottom power level of a multi-pulse chain which is optimized for the linear velocity V2 of the outer periphery test region in step 510 (FIG. 3). A waveform 1101 is a recording light emission waveform for the linear velocity V1. A waveform 1102 is a recording light emission waveform for the linear velocity V2.

The bottom power level Pmb of a multi-pulse chain, at an arbitrary linear velocity V in the information recording region between the linear velocity V1 of the inner periphery test region, and the linear velocity V2 of the outer periphery test region, is determined based on the linear velocity vs. power sensitivity characteristics of a material for the optical disc 101. For example, when the optical disc 101 is a phase-change information medium, heat energy for determining the width of a substantially middle portion of a recording mark is decreased as the linear velocity V is increased. In this case, the optimum value of Pmb is also increased with a decrease in the heat energy.

The second calculation method can be applicable when the linear velocity vs. power sensitivity characteristics of the material increases substantially according to a certain power of the linear velocity ratio. The bottom power level Pmb of a multi-pulse chain can be determined according to formula (4) for an arbitrary linear velocity.

$$Pmbn=Pmb1\times(Vn/V1)^\alpha \qquad (4)$$

where $\alpha=\log(Pmb2/Pmb1)/\log(V2/V1)$.

Thus, in step 515 (FIG. 3), the bottom power level Pmb1 of a multi-pulse chain optimized in the inner periphery test recording region and the bottom power level Pmb2 of a multi-pulse chain optimized in the outer periphery test recording region are calculated according to formula (3) or (4), thereby making it possible to easily determine the bottom power level Pmb of a multi-pulse chain for an arbitrary linear velocity V without performing test recording to an information recording region.

Although the first and second calculation methods have been described for the bottom power level Pmb of a multi-pulse chain in step 515 (FIG. 3), the recording peak power level Pp and the erase power level Pe can be calculated using the same formula (3) or (4). Specifically, if Pmb is replaced with Pp, the calculation method of step 514 (FIG. 3) is obtained. If Pmb is replaced with Pe, the calculation method of step 513 (FIG. 3) is obtained.

Thus, when an information signal is CAV recorded into an information recording region (so-called data region in which an information signal is recorded), it is possible to determine a recording peak power level Pp, an erase power level Pe, and the bottom power level Pmb of a multi-pulse chain, which are optimum to an arbitrary linear velocity V, based on either of the first or second calculation method.

Although certain preferred embodiments have been described herein, it is not intended that such embodiments be construed as limitations on the scope of the invention except as set forth in the appended claims. Various other modifications and equivalents will be apparent to and can be readily made by those skilled in the art, after reading the description herein, without departing from the scope and spirit of this invention. All patents, published patent applications and publications cited herein are incorporated by reference as if set forth fully herein.

INDUSTRIAL APPLICABILITY

According to the information recording method, the information recording apparatus, and the information recording medium of the present invention, the bottom power level can be determined to be between the peak power level and the erase power level which is lower than the peak power level, while keeping the interpulse spacing constant. Therefore, the bottom power level of a multi-pulse chain can be determined while keeping the pulse width constant, it is possible to determine the bottom power level, even when information is recorded at a high transfer rate so that it is difficult to control the pulse width. As a result, a recording mark having an appropriate shape and width can be formed, i.e., it is possible to record information represented by such a recording mark onto an information recording medium.

According to the information recording method, information recording apparatus, and the information recording medium of the present invention, it is possible to solve the conventional problem that when information is recorded at a high transfer rate so that the rising time and the falling time of a recording light emission waveform are not sufficient for driving the multi-pulse width Tmp, the mark width of the middle portion of a recording mark is narrow. As a result, it is possible to obtain an appropriate mark width of the middle portion of a recording mark. Thereby, information represented by a high-quality signal with less bit error can be stably recorded onto an information recording medium.

According to the information recording method, information recording apparatus, and the information recording medium of the present invention, the optimum value of the bottom power level can be determined by calculation. Therefore, the present invention can be used in applications in which the relative speed of an information layer of an information recording medium to a light beam emitted by an optical head (so-called linear velocity) is changed (e.g., CAV recording). As a result, it is possible to appropriately access the information recording medium.

The invention claimed is:

1. An information recording method, comprising the steps of:
   (a) determining a power level of a pulse sequence;
   (b) generating the pulse sequence based on the power level determined; and
   (c) irradiating an information recording medium with light corresponding to the pulse sequence generated to record information represented by at least either a recording mark or a space onto the information recording medium, wherein the pulse sequence comprises a multi-pulse chain for forming the recording mark, the multi-pulse chain comprises a plurality of pulses having a peak power level, and in the step (a), a bottom power level is determined between the peak power level and an erase power level which is lower than the peak power level while keeping a width of each of a plurality of pulses of which the multi-pulse chain is comprised constant.

2. An information recording method according to claim 1, wherein the pulse sequence comprises a starting pulse provided at a starting end of the pulse sequence, a terminating pulse provided at a terminating end of the pulse sequence, and the multi-pulse chain, the starting pulse is used for forming a starting portion of the recording mark, the terminating pulse is used for forming a terminating portion of the recording mark, and the multi-pulse chain is provided between the starting pulse and the terminating pulse, and the multi-pulse chain is used for forming a substantially middle portion of the recording mark.

3. An information recording method according to claim 1, wherein the pulse width is 0.5T where T represents a cycle of a recording clock.

4. An information recording method according to claim 1, wherein the step (a) comprises the steps of:

irradiating the information recording medium with light corresponding to a pulse sequence generated based on an initial power level to record test information represented by a test recording mark onto the information recording medium;

reproducing a test signal from the recorded test information and detect an amplitude of the reproduced test signal; and determining the bottom power level based on the detected amplitude.

5. An information recording method according to claim 1, where the step (a) comprises:

irradiating the information recording medium with light corresponding to a pulse sequence generated based on an initial power level to record test information represented by a test recording mark onto the information recording medium;

reproducing a test signal from the recorded test information and detect a jitter value of the reproduced test signal or a bit error rate of the reproduced test signal; and determining the bottom power level based on the detected jitter value or bit error rate.

6. An information recording method according to claim 1, where the step (a) comprises:

irradiating the information recording medium with light corresponding to a pulse sequence generated based on an initial power level to record test information represented by a test recording mark onto the information recording medium;

reproducing a test signal from the recorded test information and detect a duty ratio of the reproduced test signal or an asymmetry value of the reproduced test signal; and determining the bottom power level based on the detected duty ratio or asymmetry value.

7. An information recording method according to claim 1, wherein the step (a) comprises:

determining the erase power level, the peak power level, and the bottom power level in this order.

8. An information recording method according to claim 1, wherein the step (a) comprises:

determining the peak power level based on the formula:

$$Pmb = k1 \times Pp$$

where Pmb represents the bottom power level, Pp represents the peak power level, and k1 represents a specific constant.

9. An information recording method according to claim 1, wherein the step (a) comprises:

determining the erase power level based on the formula:

$$Pmb = k2 \times Pe$$

where Pmb represents the bottom power level, Pe represents the erase power level, and k2 represents a specific constant.

10. An information recording method according to claim 1, wherein the step (a) comprises:

determining at least one of the peak power level and the erase power level based on the formula:

$$Pmb = Pe + k3 \times (Pp - Pe)$$

where Pmb represents the bottom power level, Pp represents the peak power level, Pe represents the erase power level, and k3 represents a specific constant.

11. An information recording method according to claim 1, wherein the step (a) comprises:

determining at least one of the peak power level and the erase power level based on the formula:

$$Pmb = Pe + k4 \times (Pp + Pe)$$

where Pmb represents the bottom power level, Pp represents the peak power level, Pe represents the erase power level, and k4 represents a specific constant.

12. An information recording method according to claim 1, wherein the step (a) comprises:

determining the power level of the pulse sequence based on the formula:

$$Pmbn = (Pmb2 - Pmb1) \times (Vn - V1)/(V2 - V1) + Pmb1$$

where Pmb1 represents a first bottom power level for a first linear velocity V1 of the information recording medium, Pmb2 represents a second bottom power level for a second linear velocity V2 of the information recording medium, and Pmbn represents the bottom power level for an arbitrary linear velocity Vn (V1<Vn<V2).

13. An information recording method according to claim 12, wherein the first bottom power level Pmb1 is previously optimized and recorded around a radially innermost periphery of the information recording medium, and the second bottom power level Pmb2 is previously optimized and recorded around a radially outermost periphery of the information recording medium.

14. An information recording method according to claim 1, wherein the step (a) comprises:

determining the power level of the pulse sequence based on the formula:

$$Pmbm = Pmb1 \times (Vm/V1)^{\alpha}$$

$$\alpha = \log(Pmb2/Pmb1)/\log(V2/V1)$$

where Pmb1 represents a first bottom power level for a first linear velocity V1 of the information recording medium, Pmb2 represents a second bottom power level for a second linear velocity V2 of the information recording medium, and Pmbm represents the bottom power level for an arbitrary linear velocity Vm (V1<Vm<V2).

15. An information recording method according to claim 14, wherein the first bottom power level Pmb1 is previously optimized and recorded around a radially innermost periphery of the information recording medium, and the second bottom power level Pmb2 is previously optimized and recorded around a radially outermost periphery of the information recording medium.

16. An information recording apparatus, comprising:
means for determining a power level of a pulse sequence;
means for generating the pulse sequence based on the power level determined; and
means for irradiating an information recording medium with light corresponding to the pulse sequence generated to record information represented by at least either a recording mark or a space onto the information recording medium,
wherein the pulse sequence comprises a multi-pulse chain for forming the recording mark,
the multi-pulse chain comprises a plurality of pulses having a peak power level, and
in the determining means, a bottom power level is determined between the peak power level and an erase power level which is lower than the peak power level while keeping a width of each of a plurality of pulses of which the multi-pulse chain is comprised constant.

17. An information recording apparatus according to claim 16, where in the pulse width is 0.5T where T represents a cycle of a recording clock.

18. An information recording apparatus according to claim 16, wherein the power level determining means comprises:
means for irradiating the information recording medium with light corresponding to a pulse sequence generated based on an initial power level to record test information represented by a test recording mark onto the information recording medium;
means for reproducing a test signal from the recorded test information and detect an amplitude of the reproduced test signal; and
means for determining the bottom power level based on the detected amplitude.

19. An information recording apparatus according to claim 16, wherein the power level determining means comprises:
means for irradiating the information recording medium with light corresponding to a pulse sequence generated based on an initial power level to record test information represented by a test recording mark onto the information recording medium;
means for reproducing a test signal from the recorded test information and detect a jitter value of the reproduced test signal or a bit error rate of the reproduced test signal; and
means for determining the bottom power level based on the detected jitter value or bit error rate.

20. An information recording apparatus according to claim 16, wherein the power level determining means comprises:
means for irradiating the information recording medium with light corresponding to a pulse sequence generated based on an initial power level to record test information represented by a test recording mark onto the information recording medium;
means for reproducing a test signal from the recorded test information and detect a duty ratio of the reproduced test signal or an asymmetry value of the reproduced test signal; and
means for determining the bottom power level based on the detected duty ratio or asymmetry value.

21. An information recording apparatus according to claim 16, wherein the power level determining means comprises:
determining the erase power level based on the formula:

$$Pmb = k2 \times Pe$$

where Pmb represents the bottom power level, Pe represents the erase power level, and k2 represents a specific constant.

22. An information recording apparatus according to claim 16, wherein the power level determining means comprises:
determining the power level of the pulse sequence based on the formula:

$$Pmbn = (Pmb2 - Pmb1) \times (Vn - V1)/(V2 - V1) + Pmb1$$

where Pmb1 represents a first bottom power level for a first linear velocity V1 of the information recording medium,
Pmb2 represents a second bottom power level for a second linear velocity V2 of the information recording medium, and
Pmbn represents the bottom power level for an arbitrary linear velocity Vn (V1<Vn<V2).

23. An information recording medium, comprising a recording region, wherein:
a predetermined value for determining a power level of a pulse sequence is recorded in the recording region;
the pulse sequence comprises a multi-pulse chain for forming a recording mark;
the multi-pulse chain comprises a plurality of pulses having a peak power level;
the predetermined value is at least one of a constant value indicating a width of each of a plurality of pulses of which the multi-pulse chain is comprised constant and a bottom power level determined between the peak power level and an erase power level which is lower than the peak power level.

24. An information recording medium, comprising a recording region, wherein:
a predetermined value for determining a power level of a pulse sequence is recorded in the recording region;
the pulse sequence comprises a multi-pulse chain for forming a recording mark;
the multi-pulse chain comprises a plurality of pulses having a peak power level;
the predetermined value is at least one constant value of k1, k2, k3 and k4, wherein k1, k2, k3, k4, Pmb, Pe and Pp satisfy at least one of the formulas:

$$Pmb = k1 \times Pp;$$

$$Pmb = k2 \times Pe;$$

$$Pmb = Pe + k3 \times (Pp - Pe); \text{ and}$$

$$Pmb = Pe + k4 \times (Pp + Pe)$$

where Pmb represents a bottom power level, Pp represents the peak power level, and Pe represents an erase power level which is lower than the peak power level, and
the bottom power level is determined between the peak power level and the erase power level.

* * * * *